United States Patent
Hillier

(10) Patent No.: US 9,546,562 B2
(45) Date of Patent: Jan. 17, 2017

(54) SEAL SEGMENT

(71) Applicant: ROLLS-ROYCE PLC, London (GB)

(72) Inventor: Steven Hillier, Manchester (GB)

(73) Assignee: ROLLS-ROYCE plc, London (GB)

( * ) Notice: Subject to any disclaimer, the term of this patent is extended or adjusted under 35 U.S.C. 154(b) by 400 days.

(21) Appl. No.: 14/224,952

(22) Filed: Mar. 25, 2014

(65) Prior Publication Data

US 2014/0294571 A1   Oct. 2, 2014

(30) Foreign Application Priority Data

Mar. 28, 2013   (GB) .................................. 1305702.1

(51) Int. Cl.
| | | |
|---|---|---|
| *F01D 11/12* | (2006.01) | |
| *F01D 9/04* | (2006.01) | |
| *F01D 11/08* | (2006.01) | |
| *F01D 25/00* | (2006.01) | |

(52) U.S. Cl.
CPC ............... *F01D 11/122* (2013.01); *F01D 9/04* (2013.01); *F01D 11/08* (2013.01); *F01D 25/005* (2013.01)

(58) Field of Classification Search
CPC ...... F01D 11/122; F01D 11/08; F01D 25/005; F01D 9/04
USPC .................... 415/173.1, 173.3, 173.6, 173.4, 174.2, 415/174.4
See application file for complete search history.

(56) References Cited

U.S. PATENT DOCUMENTS

| | | | | |
|---|---|---|---|---|
| 6,139,257 A | * | 10/2000 | Proctor | ..................... F01D 9/04 415/115 |
| 8,246,299 B2 | * | 8/2012 | Razzell | ................. F01D 11/005 415/116 |
| 2004/0047726 A1 | * | 3/2004 | Morrison | .................. F01D 9/04 415/116 |
| 2007/0020087 A1 | * | 1/2007 | Durocher | .................. F01D 9/04 415/115 |

FOREIGN PATENT DOCUMENTS

| | | |
|---|---|---|
| EP | 0 751 104 A2 | 1/1997 |
| EP | 1 965 030 A2 | 9/2008 |
| EP | 2 589 774 A1 | 5/2013 |
| GB | 2 390 402 A | 1/2004 |

OTHER PUBLICATIONS

British Search Report issued in British Patent Application No. GB1305702.1 on Sep. 27, 2013.

* cited by examiner

*Primary Examiner* — Hoang Nguyen
(74) *Attorney, Agent, or Firm* — Oliff PLC

(57) ABSTRACT

A seal segment is provided for a shroud ring of a rotor of a gas turbine engine. The seal segment is positioned, in use, radially adjacent the rotor. The seal segment includes a body portion having front and rear sides which each contain a respective slot that extends in the circumferential direction so that a respective hook formation is insertable into each slot for attaching the seal segment to the engine casing. The body portion is formed from continuous fiber reinforced ceramic matrix composite, reinforcing fibers of the composite wrapping around each slot so that, at the base of the slot, the reinforcing fibers are parallel to the surface of the body portion.

10 Claims, 3 Drawing Sheets

SEAL SEGMENT

FIELD OF THE INVENTION

The present invention relates to a seal segment for a shroud ring of a rotor of a gas turbine engine, the segment including a body portion formed from continuous fibre reinforced ceramic matrix composite.

BACKGROUND OF THE INVENTION

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However, as turbine entry temperatures increase, it is necessary to develop components and materials better able to withstand the increased temperatures.

This has led to the replacement of metallic shroud segments with ceramic matrix composite shroud segments having higher temperature capabilities. To accommodate the change in material, however, adaptations to the segments have been proposed. For example, EP 0751104 discloses a ceramic segment having an abradable seal which is suitable for use with nickel base turbine blades, and EP 1965030 discloses a hollow section ceramic seal segment.

A conventional method of attaching shroud segments to other components is a "birdmouth" type assembly, in which a slot in one component is attached to a hook in another component. When assembled, the two components can then locate across an interface which is perpendicular to the direction of the primary load.

However, such an assembly approach is problematic to implement in a ceramic matrix composite component. For example, when the slot is cut into such a component, reinforcing fibres in the composite may be severed, Further, undesirable stress concentrations may be formed at the base of the slot.

SUMMARY OF THE INVENTION

It would be desirable to provide a seal segment which utilises ceramic matrix composite but has an improved attachment capability.

Accordingly, in a first aspect, the present invention provides a seal segment for a shroud ring of a rotor of a gas turbine engine, the seal segment being positioned, in use, radially adjacent the rotor, wherein:

the seal segment includes a body portion having front and rear sides which each contain a respective slot that extends in the circumferential direction so that a respective hook formation is insertable into each slot for attaching the seal segment to the engine casing; and the body portion is formed from continuous fibre reinforced ceramic matrix composite, reinforcing fibres of the composite wrapping around each slot so that, at the base of the slot, the reinforcing fibres are parallel to the surface of the body portion characterised in that: the body portion is formed from a plurality of bonded-together sub-components, respective C-section sub-components (38) forming the body portion in the vicinity of the slots.

By wrapping the reinforcing fibres around the slots, loading stresses at the base of each slot can be better transmitted to the fibres, such that peak stress concentrations in the composite can be reduced. Further, the fibres tend to lie across the pathway of incipient cracks at the bases of the slots, deflecting and blunting the cracks, and generally making it more difficult for any cracks to grow. In this way, a "birdmouth" type of assembly can be realised, In a second aspect, the present invention provides a shroud ring of a rotor of a gas turbine engine, the shroud ring including an annular array of seal segments of the first aspect.

In a third aspect, the present invention provides a gas turbine engine having the shroud ring of the second aspect.

Optional features of the invention will now be set out. These are applicable singly or in any combination with any aspect of the invention, The body portion bonded-together sub-components may be bonded using ceramic cement for example. A body portion built up from a plurality of sub-components can be easier to manufacture from continuous fibre reinforced ceramic matrix composite than a body portion which is put together as one piece.

In a central section of the body portion between the slots, reinforcing fibres of the composite may lie substantially parallel to a radially inward facing surface of the body portion. These fibres can then be appropriately arranged to withstand bending stresses in the body portion (the bending stresses primarily being produced by pressure and temperature differentials across the radial thickness of the seal segment, and reaction loads at the slots), and also to resist crack growth in a radial direction through segment. In the central section, the reinforcing fibres can lie in plys that are dished towards the radially inward facing surface of the body portion. Such dishing can improve the loading performance of the fibres.

A central sub-component of the body portion may form the central section of the body portion, the central sub-component being bonded at front and rear sides thereof to the C-section sub-components which form the body portion in the vicinity of the slots. Indeed, a separate inner sub-component of the body portion may then form the radially inward facing surface of the body portion, the reinforcing fibres in the inner sub-component being parallel to the radially inward facing surface, and the inner sub-component being bonded at a radially outer surface thereof to the central sub-component.

The central and C-section sub-components can be bonded together at an interface surface. A portion of the interface surface may be radially inclined to the radially inward facing surface. The radial inclination may tangential to a radius of a dished ply. The radially inclined interface surface may be straight or curved. The curvature may have the same curvature as the dished ply.

The seal segment can include an abradable ceramic coating on the radially inward facing surface of the body portion. For example, the coating may comprise hollow ceramic spheres in a ceramic matrix, e.g. as disclosed in EP 0751104.

The seal segment may have circumferentially opposing side faces, each side face providing a respective further slot which extends in the fore and aft direction and which, in the shroud ring, contains a respective strip seal for sealing the seal segment to a circumferentially adjacent seal segment.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
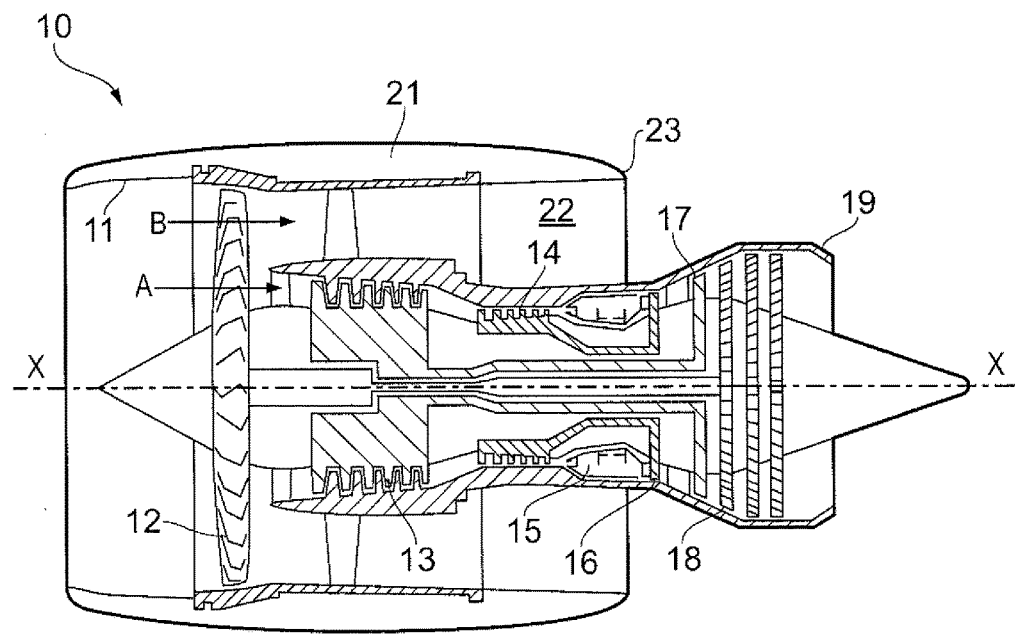
FIG. 1 shows a longitudinal sectional elevation through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
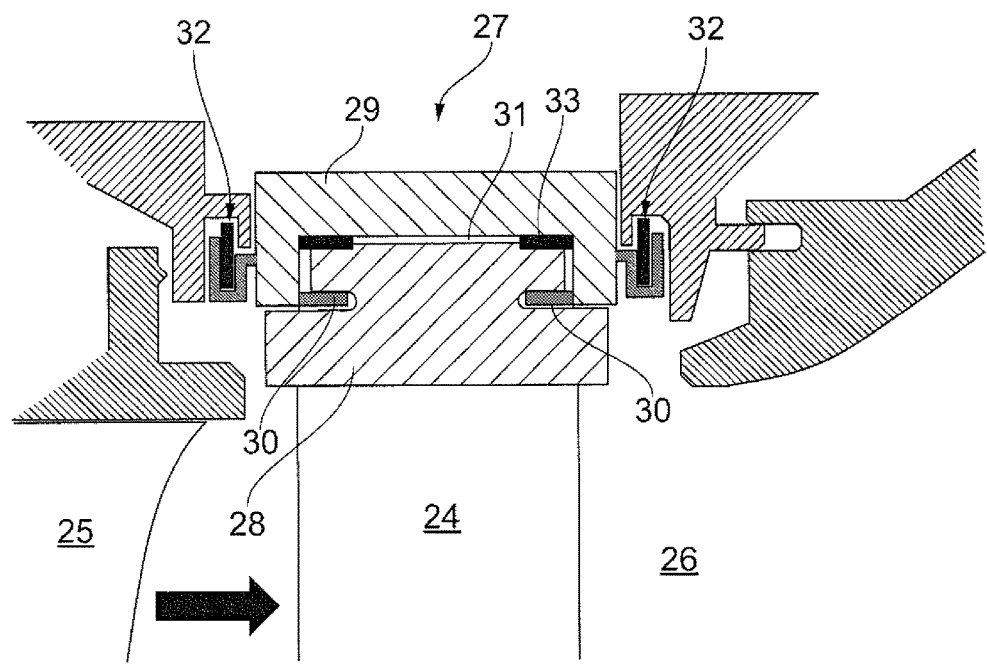
FIG. 2 shows schematically a sectional elevation through a portion of the high pressure turbine of the engine of FIG. 1.

The high pressure turbine 16 includes an annular array of radially extending rotor aerofoil blades 24, the radially outer part of one of which can be seen if reference is now made to FIG. 2, which shows schematically a sectional elevation through a portion of the high pressure turbine. Hot turbine gases flow over nozzle guide vanes 25 and the aerofoil blades 24 in the direction generally indicated by the arrow. A shroud ring 27 in accordance with the present invention is positioned radially outwardly of the shroudless aerofoil blades 24. The shroud ring 27 serves to define the radially outer extent of a short length of the gas passage 26 through the high pressure turbine 16.

The turbine gases flowing over the radially inward facing surface of the shroud ring 27 are at extremely high temperatures. Consequently, at least that portion of the ring 27 must be constructed from a material which is capable of withstanding those temperatures whilst maintaining its structural integrity. Ceramic materials are particularly well suited to this sort of application.

The shroud ring 27 is formed from an annular array of seal segments 28 attached to a part of the engine casing which takes the form of an annular, metallic backing plate 29 having a central portion and radially inwardly projecting, front and rear flanges, with inwardly directed hooks 30 formed at the ends of the flanges. Cooling air for the ring 27 enters a space 31 formed between the backing plate 29, each segment 28 and a gasket-type sealing ring 33 located between the plate 29 and the segment 28, the air being continuously replenished as it leaks, under a pressure gradient, into the working gas annulus through suitable holes (not shown) in the backing plate 29. The backing plate 29 is sealed at its front and rear sides to adjacent parts of the engine casing by piston ring-type sealing formations 32 of conventional design.

Figure 3:
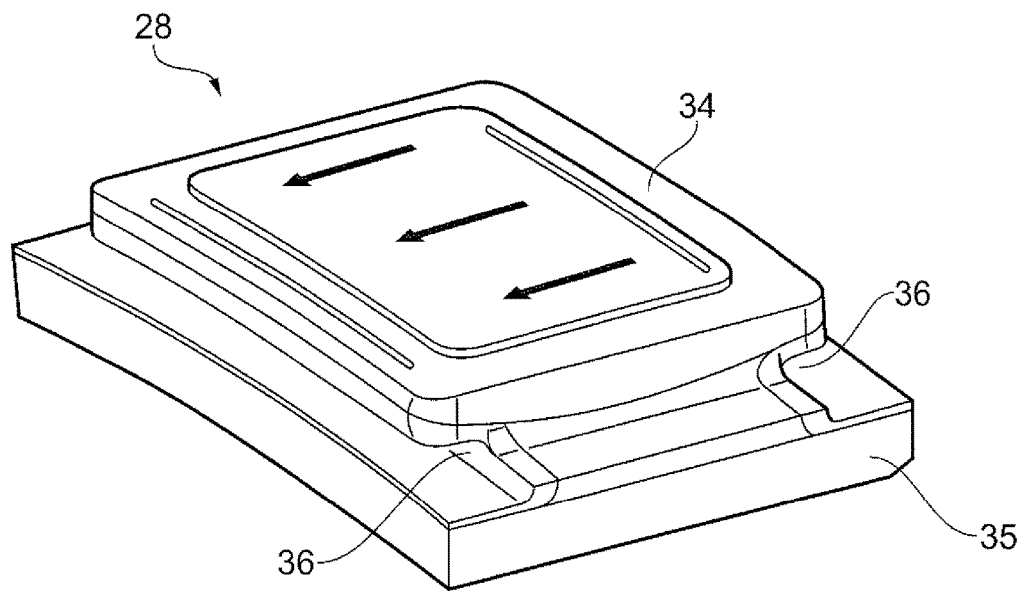
FIG. 3 shows schematically a perspective view of a seal segment.

FIG. 3 shows schematically a perspective view of one of the seal segments 28. The segment 28 has a lightly curved, plate-like, rectangular shape. A radially outer, body portion 34 of the segment 28 is formed from continuous fibre reinforced ceramic matrix composite, as discussed in more detail below. An abradable coating 35 comprising hollow ceramic spheres in a ceramic matrix, as disclosed in EP 0751104 is formed on the radially inward facing surface of the body portion 34. The abradable coating 35 also acts as a thermal barrier coating. The gasket-type sealing ring 33 (not shown in FIG. 3) runs around the edges of the radially outer surface of the body portion 34. The arrows indicate the general direction of cooling air flow over the radially outer surface.

Respective slots 36 extend in the circumferential direction along the front and rear sides of the body portion 34. The backing plate 29 can be machined as a single piece, and then cut in (typically two) pieces. Each seal segment 28 can be mounted to the backing plate by sliding in the circumferential direction onto a respective cut piece of the back plate. The cut pieces are then joined back together again.

Figure 4:
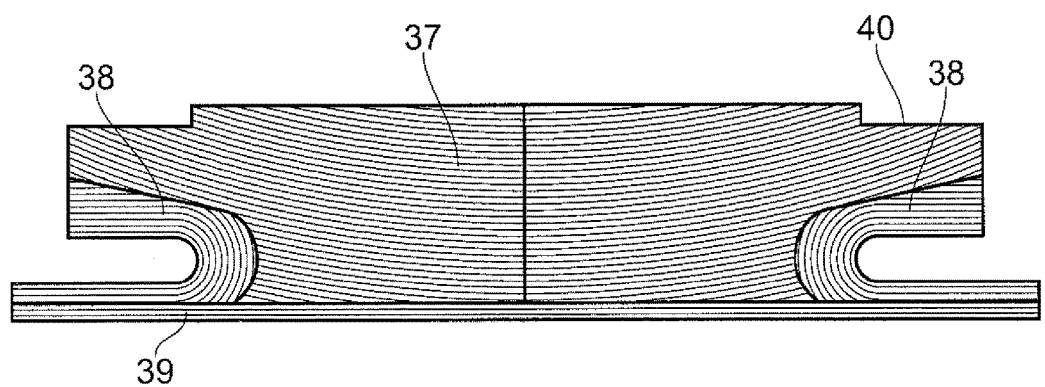
FIG. 4 shows schematically a cross-section through a body portion of the seal segment of FIG. 3.

FIG. 4 shows schematically a cross-section through the body portion 34, which is formed from a number of sub-components. A central sub-component 37 has the reinforcing fibres of the composite arranged in plys that are substantially parallel to the radially inner surface of the body portion 34, but are lightly dished towards that surface. To the front and rear sides of the central sub-component 37 are respective C-section sub-components 38 in which the reinforcing fibres wrap around the respective slot 36 so that, at the base of each slot, the fibres are parallel to the surface of the body portion. An optional inner sub-component 39, in which the reinforcing fibres are parallel to the radially inward facing surface of the body portion 34, can extend the radially over the radially inner surfaces of the central sub-component 37 and the C-section sub-components 38.

By dished it is meant that the plys are bent or domed towards the radially inner surface towards the centre of the central sub-component. The benefit of providing lightly dished plys is that it allows the fibres which are located at the radial centre of the component to extend across the full width of the component without being interrupted by the C-section sub-components. The radius of the bend shown in FIG. 4 is constant across the width of the component but the skilled person will appreciate that this might not be the case in other embodiments.

The central sub-component 37 includes recesses in which the C-section sub-components are located. The inner surface of the recess corresponds to the outer surface of the C-section sub-component such that the two meet at an interface surface.

The inner surface of the recess includes a radially inclined portion which slopes relative the radially inward facing surface of the body, and a curved portion which accommodates the curvature of the C-section bend. The slope of the radially inclined slope is tangential to the ply which intersects the C-section sub-component where the junction between the radially inclined portion and curved portion. Providing a tangential line like this allows the plys of the dished central sub-component to extend fully from radially outwards of the C-section sub-component to the opposing side whilst maximising the thickness of the C-section sub-component. This allows the fibre lengths to be longer which helps strengthen the component external gas pressure which exerts a radially inward stress whilst providing the C-section sub-component with a suitable thickness for distributing the slot stress as discussed below in relation to FIG. 5b.

Each sub-component 37, 38, 39 can be produced by using an oxide ceramic matrix composite system by stacking successive plys formed from a cloth of woven continuous reinforcement. As each ply is stacked it is covered in a slurry containing a binder, water and ceramic. The stacked plys are pressed to remove water, the binder acting to form a self-supporting green form. The green is then heated in a furnace to drive off residual moisture and sinter the ceramic particles to form the surrounding matrix. Curved or straight-sided blocks can readily be formed in this way. The overall shape of the sub-components and features, such as a location recess 40 for sealing ring 33, can be produced by subsequent machining where required. By way of example, the reinforcement fibres can be Nextel720™ alumina silicate fibres available from 3M, and the ceramic particles can be alumina particles or a mixture of alumina and silicate particles.

The separately produced sub-components are bonded together using ceramic cement. It will be appreciated that the invention is applicably to other ceramic matrix composite systems, such as the so-called SiC/SiC, and these will be manufactured accordingly. For example, instead of machining the sub-components, the sub-components can be formed into the required shape from the SiC fibres and temporarily attached together prior to a chemical vapour infiltration which acts to bond the sub-components together.

The abradable coating 35 can be moulded directly on the body portion 34, or cast separately to the required shape and then glued to the body portion 34, as discussed in EP 0751104.

Figure 5A:
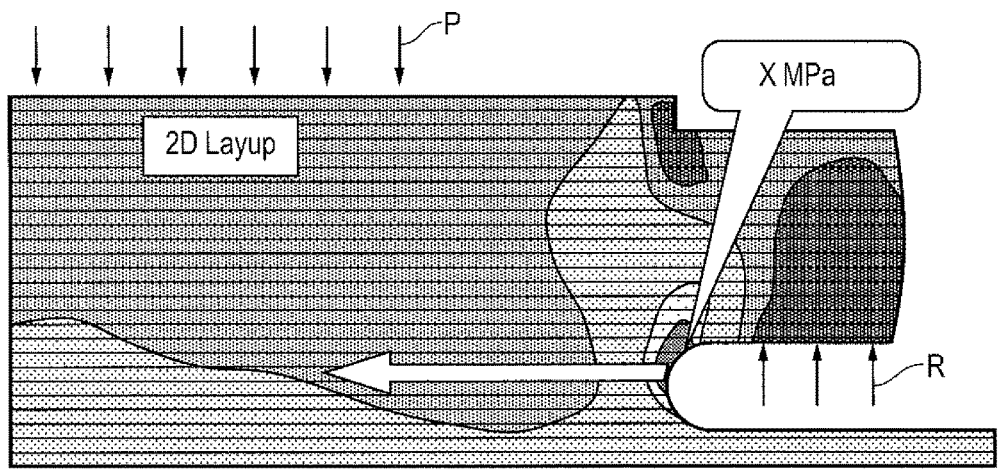
FIG. 5 shows (a) on a cross-section through a modelled conventional seal segment the inter-laminar tensile stress resulting from a representative reaction load applied at the radially upper surface of a slot at the right hand side of the segment and a representative pressure load applied over the radially outer surface of the segment, and (b) on a corresponding cross-section through a modelled seal segment according to the present invention the inter-laminar tensile stress resulting from the same loads.

FIG. 5(a) shows, on a cross-section through a modelled seal segment, the inter-laminar tensile stress, as calculated from a finite element stress analysis, resulting from a representative reaction load R applied at the radially upper surface of a slot at the right hand side of the segment and a representative pressure load P applied over the radially outer surface of the segment. The segment is notionally formed by a simple stacking 2D plys, and thus corresponds to a conventional segment in which there is no attempt to wrap the reinforcing fibres of the composite around the slot at the right hand side. As a consequence, the plys end abruptly at the base of the slot. According to the analysis, although the bulk stresses in the segment are acceptable, the peak stress (X MPa) at the base of the slot reaches a value which is too high for this type of material and could Lead to crack growth as indicated by the arrow pointing from the base of the slot.

Figure 5B:
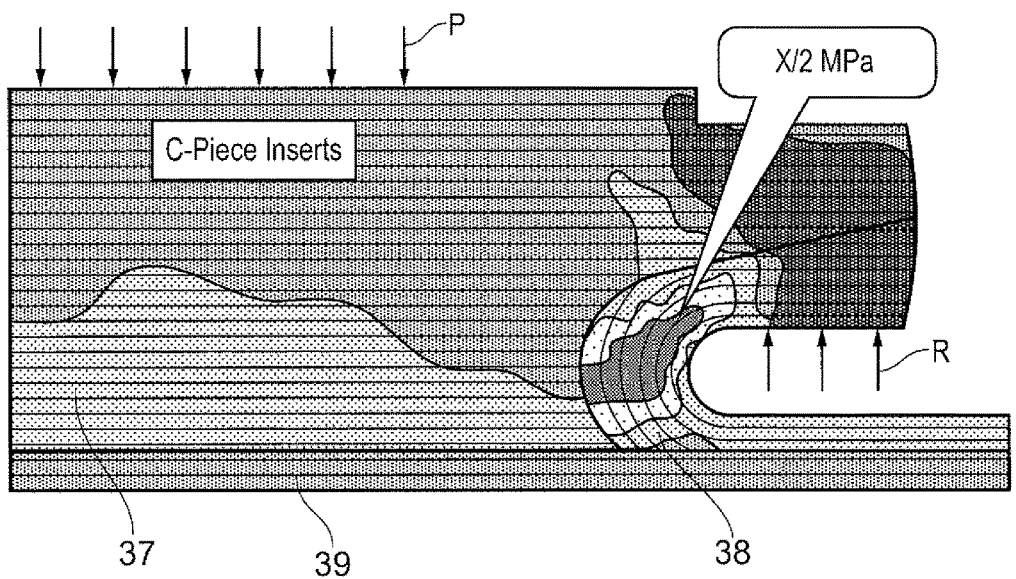

FIG. 5(b) then shows, on a corresponding cross-section through a modelled seal segment, the inter-laminar tensile stress resulting from the same loads R, P, again as calculated from a finite element stress analysis. The segment has the same external geometry as the segment of FIG. 5(a), but in this case the segment is formed from sub-components 37, 38, 39, whereby the reinforcing fibres of the composite wrap around the slot. According to the analysis, the bulk stresses in the segment are again acceptable. However, now the peak stress at the base of the slot only reaches a more acceptable X/2 MPa. Further, the direction of the fibres at the base of the slot would tend to lie across the propagation path of any incipient crack, making it difficult for the crack to grow.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A seal segment for a shroud ring of a rotor of a gas turbine engine, the seal segment being positioned, in use, radially adjacent the rotor, wherein:
   the seal segment includes a body portion having front and rear sides which each contain a respective slot that extends in the circumferential direction so that a respective hook formation is insertable into each slot for attaching the seal segment to the engine casing; and
   the body portion is formed from continuous fibre reinforced ceramic matrix composite, reinforcing fibres of the composite wrapping around each slot so that, at the base of the slot, the reinforcing fibres are parallel to the surface of the body portion,
   the body portion is formed from a plurality of bonded-together sub-components, respective C-section sub-components forming the body portion in the vicinity of the slots.

2. A seal segment according to claim 1, wherein, in a central section of the body portion between the slots, reinforcing fibres of the composite lie substantially parallel to a radially inward facing surface of the body portion.

3. A seal segment according to claim 2, wherein, in said central section, the reinforcing fibres lie in plys that are dished towards the radially inward facing surface of the body portion.

4. A seal segment according to claim 2, wherein a central sub-component of the body portion forms said central section, the central sub-component being bonded at front and rear sides thereof to the C-section sub-components.

5. A seal segment according to claim 4 wherein the central and C-section sub-components are bonded at an interface surface, and a portion of the interface surface is radially inclined to the radially inward facing surface.

6. A seal segment according to claim 3 wherein the central and C-section sub-components are bonded at an interface surface, and a portion of the interface surface is radially inclined to the radially inward facing surface, wherein the radial inclination is tangential to a radius of a dished ply.

7. A seal segment according to claim 1, wherein an inner sub-component of the body portion forms said radially inward facing surface, the reinforcing fibres in the inner sub-component are parallel to said radially inward facing surface, and the inner sub-component being bonded at a radially outer surface thereof to the central sub-component.

8. A seal segment according to claim 1, which includes an abradable ceramic coating on the radially inward facing surface of the body portion.

9. A shroud ring of a rotor of a gas turbine engine, the shroud ring including an annular array of seal segments of claim 1.

10. A gas turbine engine having the shroud ring of claim 9.

* * * * *